(12) United States Patent
Ahmad

(10) Patent No.: US 8,990,531 B2
(45) Date of Patent: Mar. 24, 2015

(54) MULTIPLE TIME GRANULARITY SUPPORT FOR ONLINE CLASSIFICATION OF MEMORY PAGES BASED ON ACTIVITY LEVEL

(75) Inventor: Irfan Ahmad, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 655 days.

(21) Appl. No.: 13/179,032

(22) Filed: Jul. 8, 2011

(65) Prior Publication Data

US 2012/0011508 A1    Jan. 12, 2012

Related U.S. Application Data

(60) Provisional application No. 61/363,451, filed on Jul. 12, 2010.

(51) Int. Cl.
*G06F 12/00* (2006.01)
*G06F 9/455* (2006.01)
*G06F 12/10* (2006.01)

(52) U.S. Cl.
CPC ........ *G06F 9/45558* (2013.01); *G06F 12/1009* (2013.01); *G06F 2009/45583* (2013.01)
USPC ................. 711/165; 711/6; 711/156; 711/159

(58) Field of Classification Search
CPC . G06F 9/45533; G06F 12/0246; G06F 12/08; G06F 3/0647
USPC ...................... 711/6, 156, 159, 165
See application file for complete search history.

(56) References Cited

U.S. PATENT DOCUMENTS

| | | | |
|---|---|---|---|
| 6,035,377 A | 3/2000 | James et al. | |
| 7,219,319 B2 | 5/2007 | Gould et al. | |
| 7,464,301 B1 | 12/2008 | Entezari et al. | |
| 7,809,904 B1 | 10/2010 | Wilt | |
| 2003/0217246 A1 | 11/2003 | Kubota et al. | |
| 2004/0078518 A1 | 4/2004 | Kuwata | |
| 2005/0232192 A1 | 10/2005 | Rawson | |
| 2006/0117160 A1 | 6/2006 | Jackson et al. | |
| 2006/0174107 A1 | 8/2006 | Furlong et al. | |
| 2006/0200546 A9 | 9/2006 | Bailey et al. | |
| 2007/0011421 A1 | 1/2007 | Keller et al. | |
| 2007/0288783 A1 | 12/2007 | Ogasawara et al. | |
| 2008/0034234 A1 | 2/2008 | Shimizu et al. | |
| 2008/0201542 A1 | 8/2008 | Maruyama et al. | |
| 2008/0320203 A1 | 12/2008 | Fitzgerald | |
| 2009/0064136 A1 | 3/2009 | Dow et al. | |
| 2009/0182976 A1 | 7/2009 | Agesen | |
| 2009/0240899 A1 | 9/2009 | Akagawa et al. | |
| 2010/0058086 A1* | 3/2010 | Lee ............................. | 713/322 |

(Continued)

OTHER PUBLICATIONS

U.S. Appl. No. 12/683,273, filed Jan. 6, 2010 in the name of Scales et al.
U.S. Appl. No. 12/834,669, filed Jul. 12, 2010 in the name of Ahmad et al.

(Continued)

*Primary Examiner* — Gurtej Bansal

(57) ABSTRACT

Activity level of memory pages is classified in virtual machine environment, so that processes such as live VM migration and checkpointing, among others, can be carried out more efficiently. Because each such hypervisor-based service may desire classification of activity levels of memory pages at different frequencies and different time granularities, the hypervisor supports methods to classify activity levels of memory pages for a plurality of time intervals.

24 Claims, 8 Drawing Sheets

(56) References Cited

U.S. PATENT DOCUMENTS

| | | |
|---|---|---|
| 2010/0191922 A1 | 7/2010 | Dickey |
| 2011/0154104 A1* | 6/2011 | Swanson et al. .............. 714/6.23 |
| 2011/0271070 A1 | 11/2011 | Worthington et al. |
| 2012/0011504 A1 | 1/2012 | Ahmad et al. |

OTHER PUBLICATIONS

U.S. Appl. No. 12/834,677, filed Jul. 12, 2010 in the name of Tati et al.

Final Office Action dated Aug. 22, 2014 in counterpart U.S. Appl. No. 12/834,662.

* cited by examiner

| UBF 282 | ... | PA 278 | ... | UBF 280 | ... | D 276 | A 275 | ... | US 272 | RW 271 | P 270 |

Additional Finite State Machine 530
(Transitions arcs based on current state of FSM 500)

Base Finite State Machine 500

MULTIPLE TIME GRANULARITY SUPPORT FOR ONLINE CLASSIFICATION OF MEMORY PAGES BASED ON ACTIVITY LEVEL

CROSS-REFERENCE TO RELATED APPLICATION(S)

This application claims the benefit of U.S. Provisional Patent Application Ser. No. 61/363,451, filed Jul. 12, 2010, the entire contents of which are incorporated by reference herein.

BACKGROUND

Managing memory resources is an important function of computer system software. A conventional operating system, for example, manages virtual memory to physical memory page mappings through a level of virtual to physical indirection. The virtual memory to physical memory mapping is transparent to an application referencing memory via a virtual address. This indirection enables the operating system to utilize one or more virtual memory address spaces that together are larger than physical memory and store recently accessed pages within physical memory for efficient access and to swap out pages (e.g., between memory and storage, etc.) that are less recently accessed.

In virtual machine environments, in which virtual machines (VMs) employ guest operating systems to provide guest virtual memory to guest physical memory mappings, a hypervisor provides a second level of indirection to provide guest physical memory to machine memory mappings. Because the hypervisor manages guest physical memory to machine memory page mappings, it is able to identify and isolate the guest physical memory of specified VMs within the machine memory and "migrate" memory pages of a VM from a source machine to a destination machine making possible a variety of hypervisor-based services to assist IT administrators in managing VM-based data centers. For example, entire VM states (e.g., memory space and processor state) can be migrated in real time (referred to as "live migration") from one server to another server for dynamic load balancing across hosts and other management operations, or to create backup VMs on separate hosts, which serve as replicas of the primary VM, and are used for fault tolerance (FT).

In each of these examples, memory pages are being transmitted from a source machine to a destination machine. As the process is being carried out, the same memory page, however, may be transmitted more than once, e.g., if a memory page that has been transmitted is modified at the source machine before the process completes. Retransmitting memory pages wastes time, adds computational overhead, and unnecessarily consumes network bandwidth. Therefore, what is needed in the art is a technique for carrying out hypervisor-based services in a more time and resource efficient manner.

SUMMARY

One or more embodiments of the present invention provide methods of classifying activity level of memory pages in a virtual machine environment, so that hypervisor-based services such as live VM migration and fault tolerance, among others, can be carried out more efficiently. Furthermore, because such different hypervisor-based services may desire classification of activity levels of memory pages to be sampled or otherwise determined at different frequencies over the course of time and at different granularities of precision (e.g., some hypervisor-based services may need finer granular classifications occurring every second while others may need more general classifications occurring only every minute, etc.), such methods support a plurality of time intervals.

One such method comprises the steps of receiving notification of an elapse of one of a plurality of supported time intervals, identifying a current activity level for a memory page of the virtual machine stored in a data structure maintained for the elapsed time interval, retrieving input data indicating an activity level of the memory page during the elapsed time interval, determining a new activity level for the memory page based on the retrieved input data, and storing the new activity level in an entry of the data structure corresponding to the memory page.

BRIEF DESCRIPTION OF THE DRAWINGS

FIG. 2 illustrates different bit fields within a page table entry containing information that is used in deriving the activity level of a memory page.

DETAILED DESCRIPTION

Figure 1:
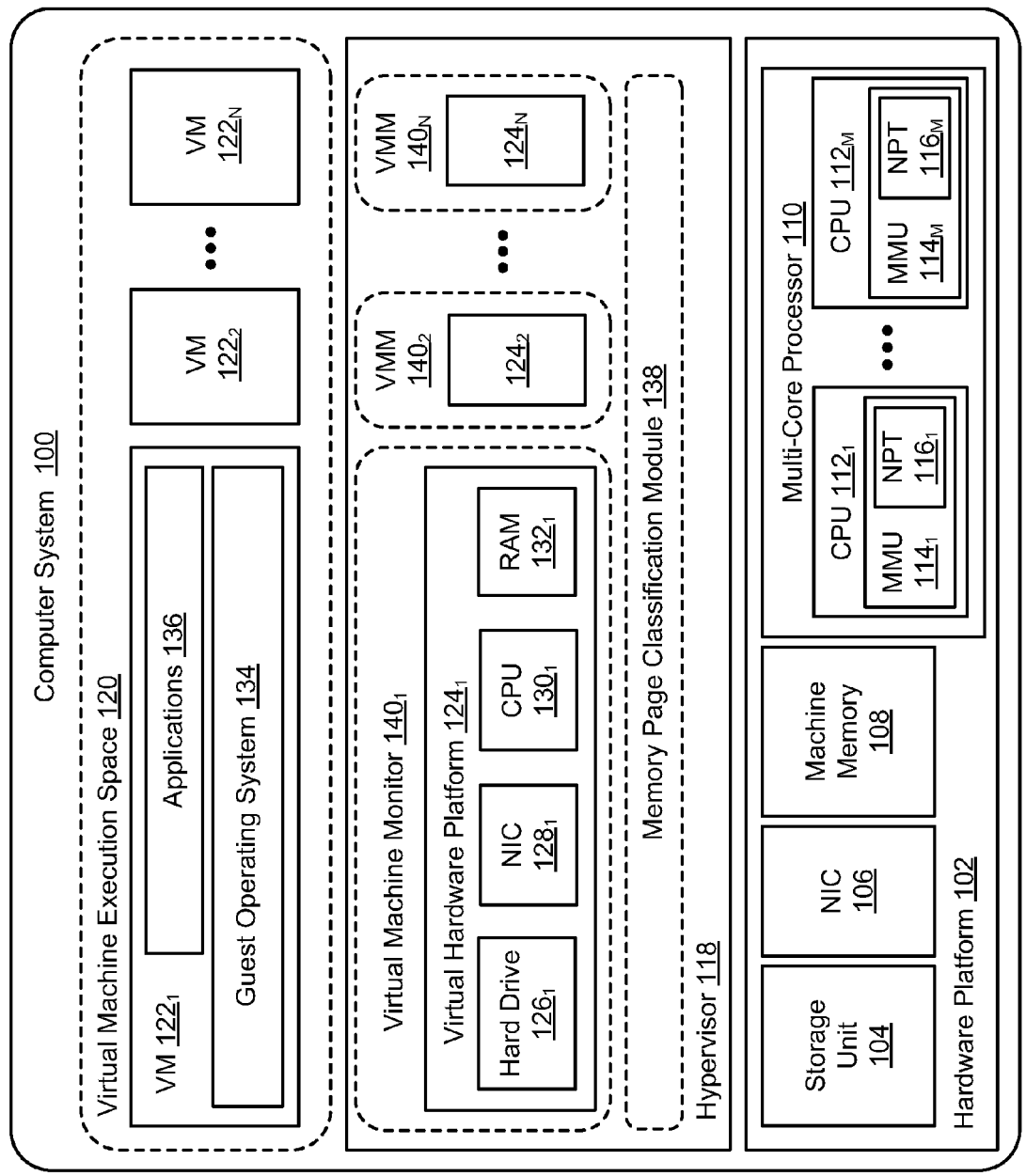
FIG. 1 is a block diagram illustrating a computer system configured to implement one or more aspects of the present invention.

FIG. 1 is a block diagram illustrating a computer system configured to implement one or more aspects of the present invention. Host computer system 100 may be constructed on a desktop, laptop or server grade hardware platform 102 such as an x86 architecture platform. Such a hardware platform may include a local storage unit 104, such as at least one hard drive, at least one network adapter (NIC 106), machine memory 108, one or more multi-core processors 110 (only one of which is illustrated in FIG. 1) and other I/O devices such as, for example and without limitation, a mouse and keyboard (not shown in FIG. 1). Multi-core processor 110 provides multiple CPUs $112_1$ to $112_M$ which operate concurrently and can read and write to any portion of machine memory 108. Each of CPUs $112_1$ to $112_M$ includes a memory management unit (MMU) 114 with a support module 116 for nested page tables (NPT), which implement a technique also known as rapid virtualization indexing (RVI) or extended page tables (EPT). One of the functions of support module 116 is traversing the NPT to translate received virtual physical addresses of a VM's guest operating system into the actual corresponding machine addresses of machine memory 108. This feature inside support module 116 is referred to herein as the "hardware NPT walker." Examples of a multi-core processor 110 that supports such nested page table structures include AMD's Opteron™ family of multi-core processors and Intel's Nehalem processors with EPT, which is the term Intel uses in lieu of nested page tables.

A virtualization software layer, also referred to hereinafter as hypervisor 118, is installed on top of hardware platform 102. Hypervisor 118 supports virtual machine execution space 120 within which multiple VMs may be concurrently instantiated and executed. As shown, virtual execution space 120 includes VMs $\mathbf{122_1}\text{-}\mathbf{122_N}$. For each of VMs $\mathbf{122_1}\text{-}\mathbf{122_N}$, hypervisor 118 manages a corresponding virtual hardware platform (i.e., virtual hardware platforms $\mathbf{124_1}\text{-}\mathbf{124_N}$) that includes emulated hardware such as at least one virtual hard drive $\mathbf{126_1}$, at least one virtual NIC $\mathbf{128_1}$, one or more virtual CPUs $\mathbf{130_1}$ (only one of which is illustrated in FIG. 1) and RAM $\mathbf{132_1}$ for VM $\mathbf{122_1}$. For example, virtual hardware platform $\mathbf{124_1}$ may function as an equivalent of a standard x86 hardware architecture such that any x86 supported operating system, e.g., Microsoft Windows®, Linux®, Solaris® x86, Novell NetWare®, FreeBSD, etc., may be installed as guest operating system 134 to execute any supported application in application layer 136 for user VM $\mathbf{122_1}$. Guest operating system 134 of VM $\mathbf{122_1}$ includes device drivers (e.g., pre-existing device drivers available for guest operating system 134 etc.) that interact with emulated devices in virtual hardware platform $\mathbf{124_1}$ as if such emulated devices were actual physical devices. Hypervisor 118 is responsible for transforming requests from device drivers in guest operating system 134 that are received by emulated devices in virtual platform $\mathbf{124_1}$, into corresponding requests to corresponding physical devices in hardware platform 102. Hypervisor 118 further comprises a memory page classification module 138 that, as further described below, classifies memory pages of a VM based on the states of a finite state machine (FSM).

It should be recognized that alternative computer systems may be configured to implement one or more aspects of the present invention, including, for example, computer systems with one or more single-core hardware processors. Similarly, computer systems without hardware support for nested page tables may be configured to implement one or more aspects of the present invention. For example, one such computer system may comprise a hypervisor 118 that manages shadow page tables in a software based MMU that maps guest virtual memory pages directly to machine memory pages in machine memory 108. It should further be recognized that the various terms, layers and categorizations used to describe the virtualization components in FIG. 1 may be referred to differently without departing from their functionality or the spirit or scope of the invention. For example, virtual hardware platforms $\mathbf{124_1}\text{-}\mathbf{124_N}$ may be considered to be part of virtual machine monitors (VMM) $\mathbf{140_1}\text{-}\mathbf{140_N}$ which implement the virtual system support needed to coordinate operations between hypervisor 118 and their respective VMs. Alternatively, virtual hardware platforms $\mathbf{124_1}\text{-}\mathbf{124_N}$ may also be considered to be separate from VMMs $\mathbf{140_1}\text{-}\mathbf{140_N}$, and VMMs $\mathbf{140_1}\text{-}\mathbf{140_N}$ may be considered to be separate from hypervisor 118. Similarly, in alternative embodiments, memory page classification module 138 of hypervisor 118 may comprise or be considered to be separate logical modules within each of VMMs $\mathbf{140_1}\text{-}\mathbf{140_N}$ that each serves corresponding VM $\mathbf{122_1}\text{-}\mathbf{122_N}$. One example of hypervisor 118 that may be used in accordance with the teachings herein is included as a component of VMware's ESX™ product, which is commercially available from VMware, Inc. of Palo Alto, Calif. It should further be recognized that other general purpose operating systems and virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives such as hard drive $\mathbf{126_1}$. It should also be recognized that the techniques taught herein could be efficiently implemented directly in hardware, such as to augment the function of a processing unit. For example, a processor such as an x86 or SPARC processor could implement heat classification via microcode or via one or more specialize hardware modules. Furthermore, a processor support chip, such as a memory interface chip, could implement page heat classification directly.

In computer system 100, in which VMs 122 employ guest operating systems 134 to provide guest virtual memory to guest physical memory mappings, hypervisor 118 provides guest physical memory to machine memory mappings. The guest virtual memory space is mapped to the guest physical memory space using guest page tables and the guest physical memory space is mapped to the machine memory space using nested page tables that are managed by hypervisor 118. In some embodiments, the guest virtual memory space may be mapped directly to the machine memory space using shadow page tables that are managed by hypervisor 118.

FIG. 2 illustrates different bit fields within a page table entry 262 of a nested page table. The bit fields include a present bit P 270, a read/write permission bit RW 271, a user/supervisor state bit US 272, an accessed bit A 275, a dirty bit D 276, a physical address PA 278, and at least one unused bit field UBF 280, 282. Additional data may also be represented in each PTE 262. The present bit P 270 indicates that a corresponding page is present in machine memory. The present bit P 270 must be equal to "1" for a valid mapping. The read/write permission bit RW 271 indicates whether the corresponding page may be written or read only. The user/supervisor bit US 272 indicates whether the page may be accessed by a user level process or if only a supervisor level process may access the page. When data is written to or read from machine memory 108, the accessed bit A 275 is set (assigned a value of "1"), and if the instruction was a write instruction, the dirty bit D 276 is also set, indicating that the memory page has been written to (the accessed and dirty bits are collectively referred to herein as "A/D" bits). Once set, the A/D bits remain set until cleared. In conventional x86 systems, the accessed bit A 275 and dirty bit D 276 may be set by hardware in response to a corresponding action, however only software may clear each bit. It should be understood that "set" being represented as a value of "1" and "cleared" being represented as a value of "0" is arbitrary and any other technically feasible representation may be used. The physical address PA 278 is a pointer to a 4K-aligned page. The twelve remaining least significant virtual address bits select a byte within the 4K-aligned page.

In the example of a computer system that utilizes shadow page tables, which map guest virtual memory pages directly to machine memory pages, the hypervisor cannot determine directly from the shadow page tables whether or not a guest physical page has been accessed or dirtied. In order to obtain A/D information of a guest physical page, the hypervisor first obtains all of the guest virtual pages that are mapped to the guest physical page using a backmap maintained by the corresponding VMM and examines the page table entries of these guest virtual pages in the shadow page tables. If the accessed A bit of any of these page table entries is set, the hypervisor determines the accessed A bit of the guest physical page to be set. If the dirty D bit of any of these page table entries is set, the hypervisor determines the dirty D bit of the guest physical page to be set.

The setting of A/D bits in page table entries by the hardware processor during execution of a VM provides a basis for classifying the activity level of memory pages corresponding to such page table entries. For example, more frequently and/or recently accessed memory pages may be classified as "hotter" pages that are more likely to be accessed in the near future while memory pages that have not been frequently and/or recently accessed may be classified as "colder" web pages that are less likely to be accessed in the near future. Various hypervisor-based services may be provided or optimized by utilizing such a heat classification system for memory pages. For example, live migration of a VM from a source machine to a destination machine can be optimized by only migrating "cold" classified memory pages prior to stunning the VM (i.e., in order to reduce the need to re-transmit memory pages that have been modified after transmission once the VM is stunned). However, different hypervisor-based services may require the heat classification of memory pages to be sampled or scanned at different rates and with different granularities of precision. For example, live migration of a VM may benefit from a more generalized heat classification based on a slower scan rate (e.g., longer scanning time intervals) while checkpointing techniques for fault tolerance may benefit from a more precise heat classification based on a faster scan rate (e.g., shorter scanning time intervals).

Figure 3:
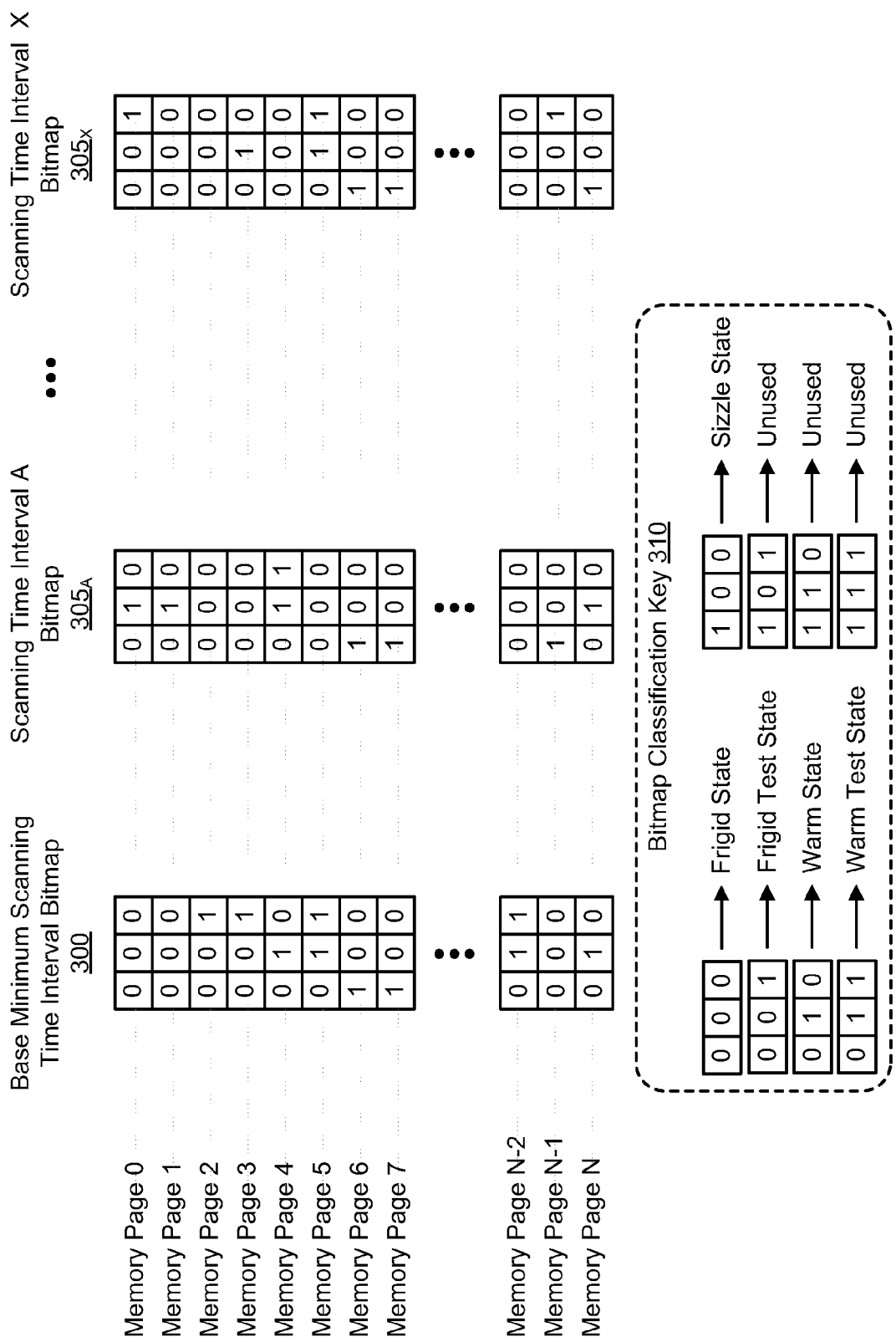
FIG. 3 depicts data structures for maintaining a heat classification state for each memory page of a VM for specified scan rates.

FIG. 3 depicts data structures for maintaining a heat classification state for each memory page of a VM for specified scan rates. In the embodiment of FIG. 3, the memory page classification module 138 of hypervisor 118 maintains a separate data structure for each of a plurality of scan rates, namely, a bitmap 300 for a base minimum scanning time interval (i.e., the fastest scan rate supported by memory page classification module 138) and bitmaps $305_A$ to $305_X$ for additional longer scanning time intervals supported by the hypervisor (i.e., slower scan rates). For example, in one embodiment, bitmap 300 may correspond to a base minimum scanning time interval of 1 second (i.e., heat classification states for memory pages are updated every 1 second) and bitmap $305_A$ may correspond to an additional scanning time interval of 4 seconds (i.e., heat classification states are updated every 4 seconds). As depicted, each set of 3 consecutive bits in bitmaps 300 and $305_A$ to $305_X$ corresponds to a memory page of the VM (e.g., memory pages 0 to N, as depicted in the embodiment of FIG. 3, comprise all the memory pages of the VM) and represents one of 5 heat classification states, as indicated by bitmap classification key 310: (1) frigid state, (2) warm test state (3) warm state, (4) sizzle test state, and (5) frigid test state. It should be recognized that the heat classification states of bitmap classification key 310 are merely exemplary and that any number of different heat classification states and names may be utilized in alternative embodiments. As the bitmaps of FIG. 3 illustrate, memory pages of the VM may have different heat classification states depending upon the scanning time interval. For example, while bitmap 300 for the base minimum scanning time interval may indicate that the state of a particular memory page is currently warm, bitmap $305_A$ for a longer scanning time interval may simultaneously indicate that the state of the memory page is frigid because the activity level for the memory page over the course of the longer scanning time interval for the scanning time interval associated with bitmap $305_A$ is relatively low. It should further be recognized that alternative embodiments may implement different data structures or otherwise track memory page heat classification states in a different manner. For example, in one alternative embodiment, heat classification states for the base minimum scanning time interval may be stored in 3 unused bits of the page table entry for the memory page itself. This implementation is described in U.S. Patent Application entitled "Page Table Data Structure for Supporting Online Classification of Memory Pages Based on Activity Level," filed concurrently with this application under U.S. patent application Ser. No. 12/834,677, which is incorporated by reference herein. In another alternative embodiment, rather than storing the heat classification as bits, for each of the supported scanning time intervals, the hypervisor maintains 5 separate linked lists that each comprise nodes representing memory pages belonging to one of the 5 heat classification states. In such an embodiment, when heat classification states are changed for a memory page, its corresponding node is removed from one linked list and added to another. Such a linked list embodiment may additionally provide easier access for hypervisor-based services that need to identify memory pages having a certain state (since such memory pages are grouped into the same linked list). This implementation is described in U.S. Patent Application entitled "Online Classification of Memory Pages Based on Activity Level," filed concurrently with this application under U.S. patent application Ser. No. 12/834,662, which is incorporated by reference herein.

Figure 4:
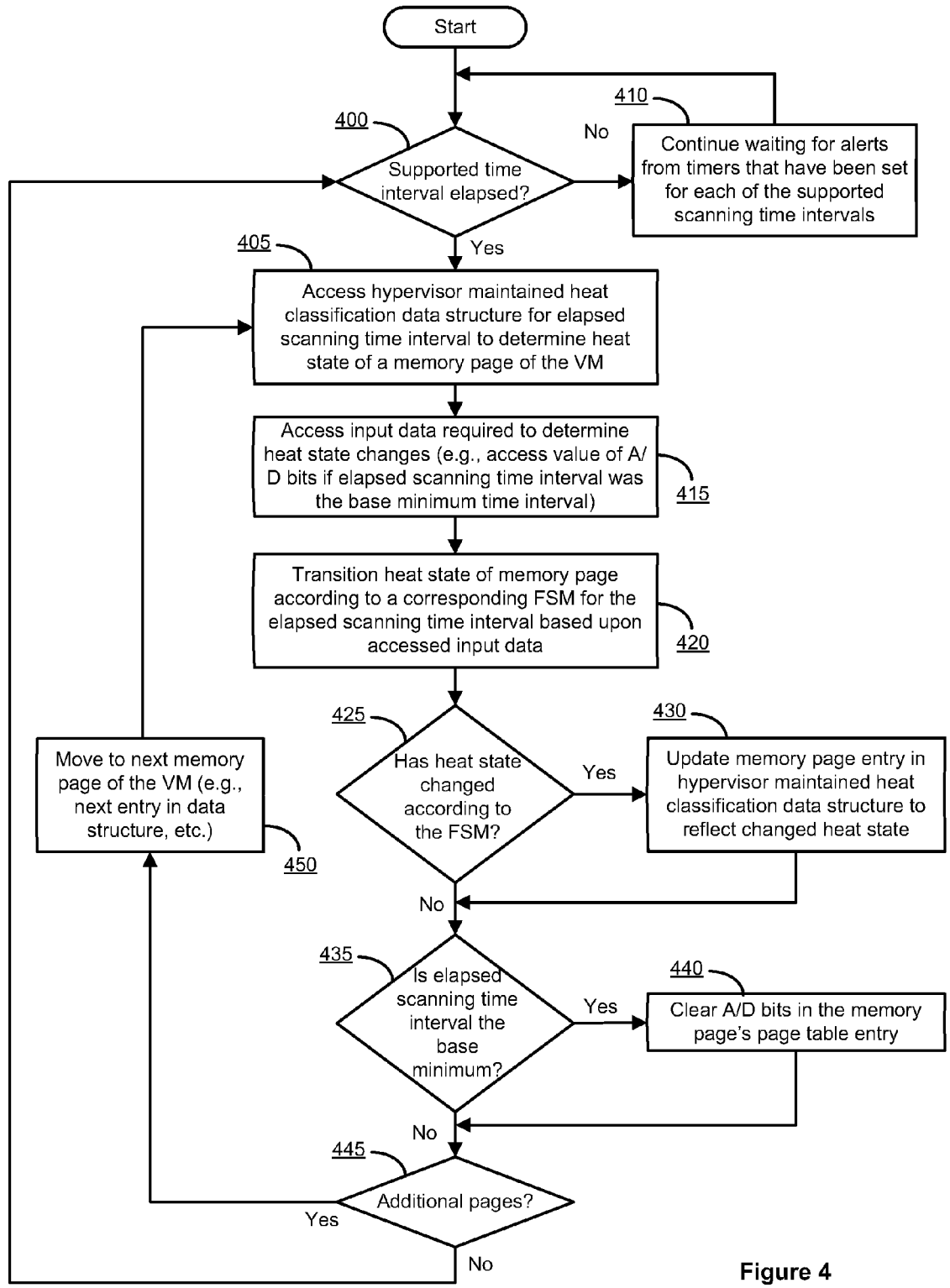
FIG. 4 is a flow diagram for classifying memory pages of a VM into a plurality of states in accordance with a finite state machine for a specified scan rate.

FIG. 4 is a flow diagram for classifying memory pages of a VM into a plurality of states in accordance with an FSM for a specified scan rate. In step 400, memory page classification module 138 of hypervisor 118 determines whether one of the supported scanning time intervals (e.g., in one embodiment, supported by bitmaps 300, $305_A$ to $305_X$) has elapsed. If one of the scanning time intervals has elapsed, then in step 405, memory page classification module 138 accesses its heat classification data structure (e.g., in one embodiment, one of bitmaps 300 or $305_A$ to $305_X$) to determine the heat state of a first memory page of the VM (e.g., memory page 0 in FIG. 3). If no scanning time intervals have elapsed, then in step 410, memory page classification module 138 continues to wait for alerts from timers that have been set for each of the supported scanning time intervals. In step 415, memory page classification module 138 accesses input data that is required to determine whether the heat state of the memory page has changed since the memory page was last sampled to classify its heat state. For example, if the scanning time interval that elapsed in step 400 is the base minimum scanning time interval, the A/D bits in the page table entry for the memory page serve as input data and are accessed to determine whether there is a change in heat state. Alternatively, as further discussed below, scanning time intervals other than the base minimum scanning time interval may utilize input data other than the A/D bits to determine whether there is a change in heat state. In step 420, memory page classification module 138 "transitions" the heat state of the memory page according to a corresponding FSM for the elapsed scanning time interval based upon the accessed input data. In step 425, if the corresponding FSM indicates that the heat state of the memory page should be changed, then in step 430, memory page classification module 138 updates the memory page entry in the heat classification data structure (e.g., see FIG. 3) to reflect the changed heat state. If the elapsed scanning time interval in step 400 was the base minimum scanning timing interval as assessed in step 435, then in step 440, memory page classification module 138 clears A/D bits in the memory page's page table entry. If there are remaining memory pages in the VM left to update as assessed in step 445, then memory page classification module 138 moves to a next memory page of the VM in step 450 and returns to step 405. It should be recognized that determining the next memory page of the VM in step 450 may be implemented in a variety of ways, depending, for example, upon the data structures utilized to maintain heat state in the embodiment. For example, if data structures similar to the bitmaps in FIG. 3 are used in an embodiment, determining the next memory page may comprise moving to the next sequentially numbered memory page in the VM's memory space. Alternatively, if separate linked list data structures are utilized to group memory pages of the same heat state together, then determining the next memory page may comprise moving to the next node in a linked list (or a next unexamined linked list, if the nodes in the current linked list have completed classification). If, in step 445, there are no more memory pages left to update, memory page classification module 138 returns to steps 400 and 410, waiting for the next elapse of a scanning time interval. It should be recognized that in certain embodiments, different scanning time intervals may be elapsing at the same time, for example, if each supported scanning time interval is a multiple of the base minimum scanning time interval. In such embodiments, multiple elapsed scanning time intervals, each with separate heat state data structures and possibly different FSMs, would be simultaneously analyzed in the flow of FIG. 4.

As indicated by the flow diagram of FIG. 4, memory page classification module 138 includes logic implementing FSMs to determine heat states for memory pages. As suggested in step 420 of FIG. 4, in certain embodiments, each supported scanning time interval may utilize a different FSM provided by memory page classification module 138 to determine heat states upon elapse of the scanning time interval. FIG. 5A depicts a base finite state machine (FSM) for classifying memory pages of a VM for a base minimum scanning time interval. Consistent with the states supported in the data structures of FIG. 3, base FSM 500 includes 5 states: frigid state 505, frigid test state 510, warm state 515, warm test state 520, and sizzle state 525. When base FSM 500 is utilized to determine heat state of memory pages for the base minimum scanning time interval, state transitions are determined based on input data of either "0" or "1" that is derived from the A/D bits of the page table entry for the corresponding memory page. For example, the D bit defines the input data in embodiments where heat state should be assessed based upon whether the memory page has been modified (e.g., such as for live migration of VMs, etc.). If the D bit is clear, then the input data is "0" indicating that the memory page has not been modified and if D bit is set, then the input data is "1" indicating that the memory page has been modified. However, it should be recognized that in other embodiments, the input data may correspond to either the A bit or the D bit, depending on whether the classification process should distinguish between read and write accesses to the memory page. A state transition arc from each state for each input data of "0" or "1" is shown. For example, in frigid state 505, an input data of "0" results in the FSM transitioning back to frigid state 505, while a input data of "1" results in the FSM transitioning to warm test state 520. In base FSM 500, sizzle state 525 is reached from either three successive input data values of "1" being sampled in a row {1,1,1}, or an input data value of "1" being sampled followed by a "0" followed by another "1" {1,0,1}. Once the FSM 500 is in sizzle state 525, any "0" subsequently encountered will cause the FSM 500 to transition to warm state 515. However, a subsequent "1" will cause a transition back to sizzle state 525. As shown, frigid state 505 is the initial state for a memory page according to FSM 500. Sizzle state 525 represents a maximum page heat (hot), while frigid state 505 represents a minimum page heat (cold). Intermediate heat levels are represented by state warm 515, state warm test 520, and state frigid test 510. It should be recognized that base FSM 500 is merely exemplary and that any other alternative base FSM with any number of heat states and transition arcs based upon A/D bits and the like may be implemented consistent with the teachings herein.

Figure 5B:
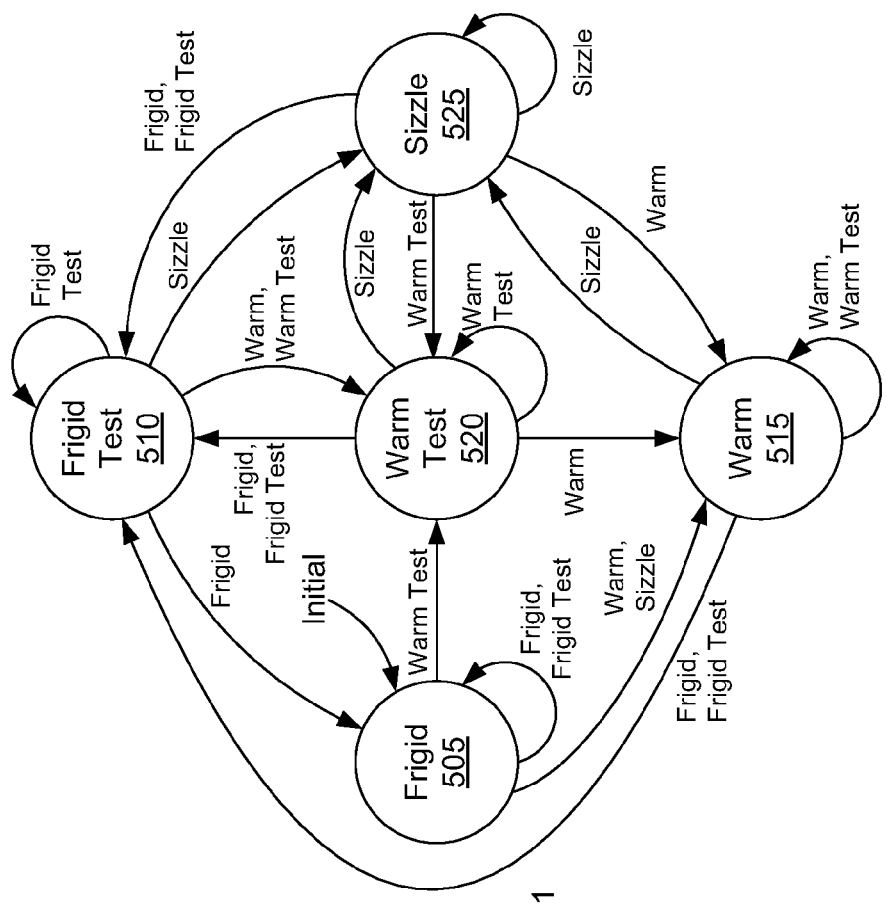
FIG. 5B depicts a finite state machine for classifying memory pages of a VM for a specified scanning time interval greater than the base minimum scanning time interval.
Figure 5A:
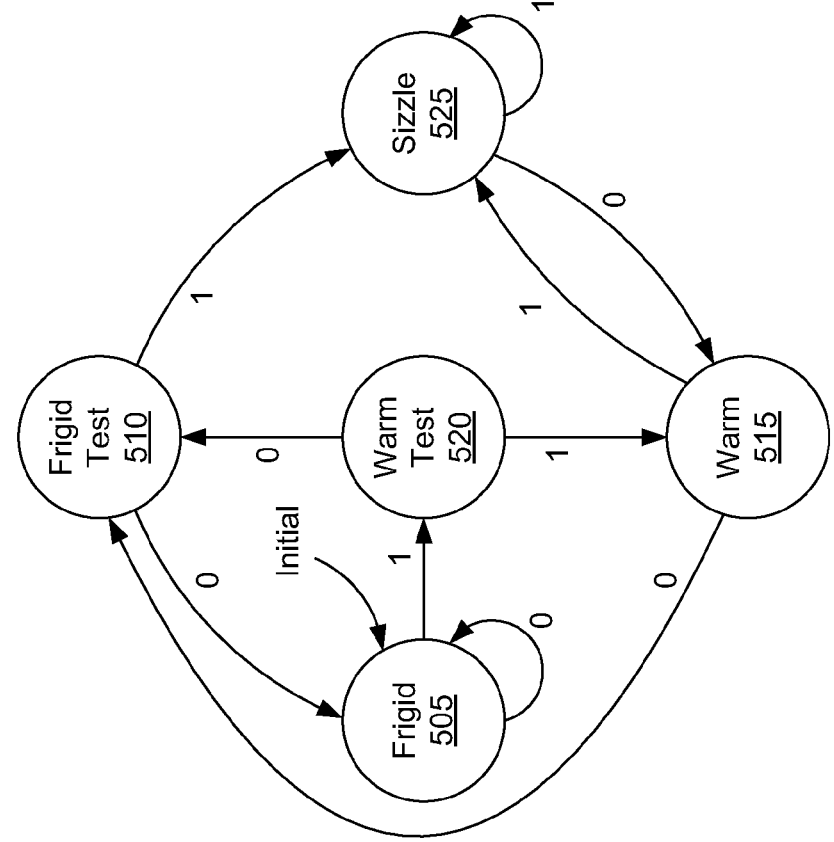
FIG. 5A depicts a base finite state machine for classifying memory pages of a VM for a base minimum scanning time interval.

FIG. 5B depicts a finite state machine for classifying memory pages of a VM for a specified scanning time interval greater than the base minimum scanning time interval. For example, additional FSM 530 may be the corresponding FSM in step 420 of FIG. 4 for the scanning time interval relating to bitmap $305_A$ of FIG. 3. As depicted, rather than basing state transitions on A/D bits (which are constantly being cleared in step 440 for base minimum scanning time intervals), state transitions in FSM 530 for a memory page are based on the current state of the memory page as determined by FSM 500 for the base minimum scanning time interval (and as stored in bitmap 300). As such, each state in FSM 530 has multiple state transition arcs corresponding to each of the possible 5 heat states of the memory page for the base minimum time interval. It should be recognized that alternative embodiments may utilize as transition state input data a multiple number of current states from multiple other supported scanning time intervals. For example, in an alternative embodiment, an FSM corresponding to the scanning time interval for bitmap $305_X$ may utilize the current heat states of the base minimum scanning time interval as reflected in bitmap 300 as well as the current heat states of an additional scanning time internal, such as that reflected in bitmap $305_A$. It should further be recognized that FSM 530 of FIG. 5B is merely exemplary and that any alternative FSMs having different transition arcs to different states may be implemented consistent with the teachings herein.

Figure 6A:
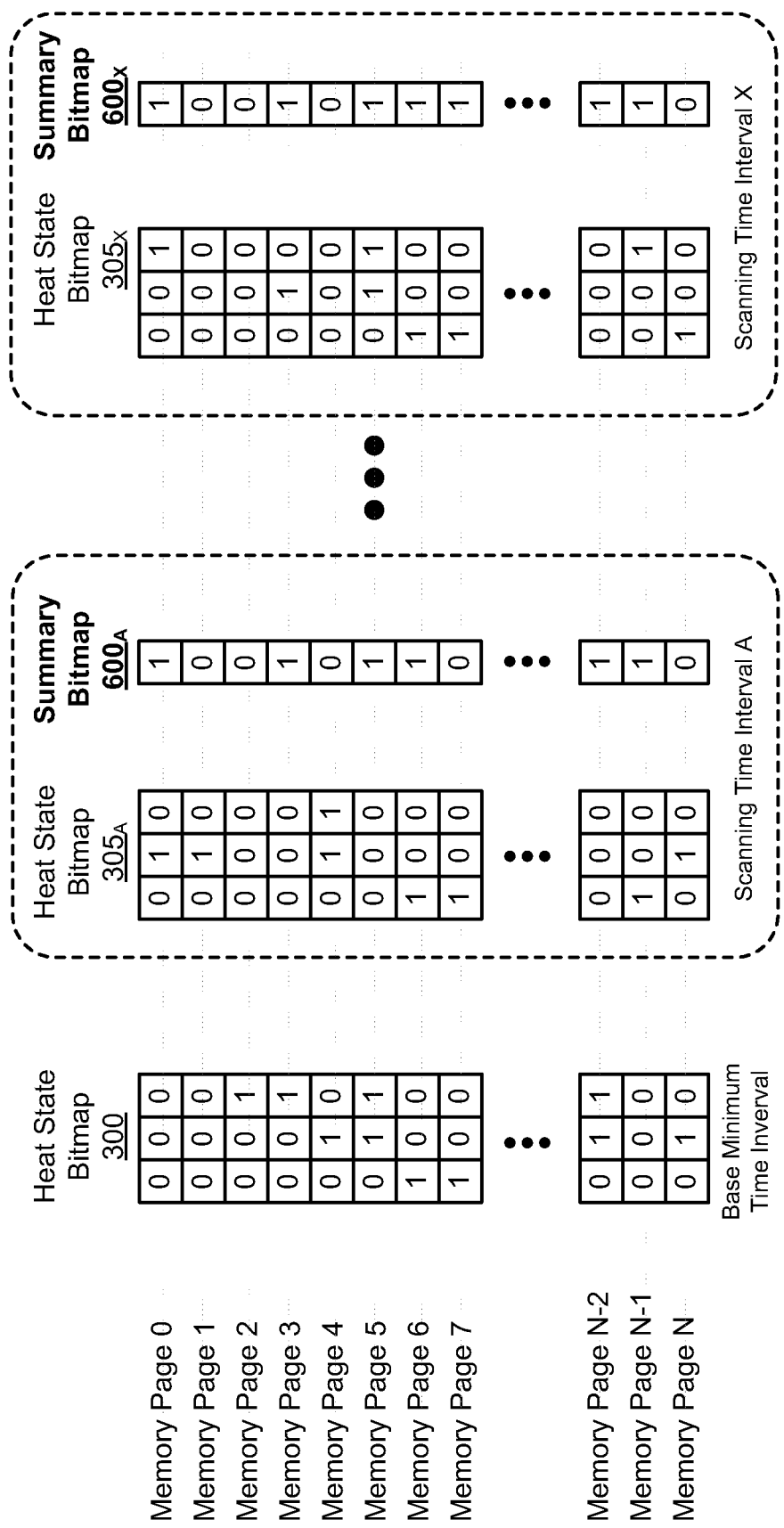
FIG. 6A depicts additional data structures for supporting multiple scanning time intervals with a common FSM.
Figure 6B:
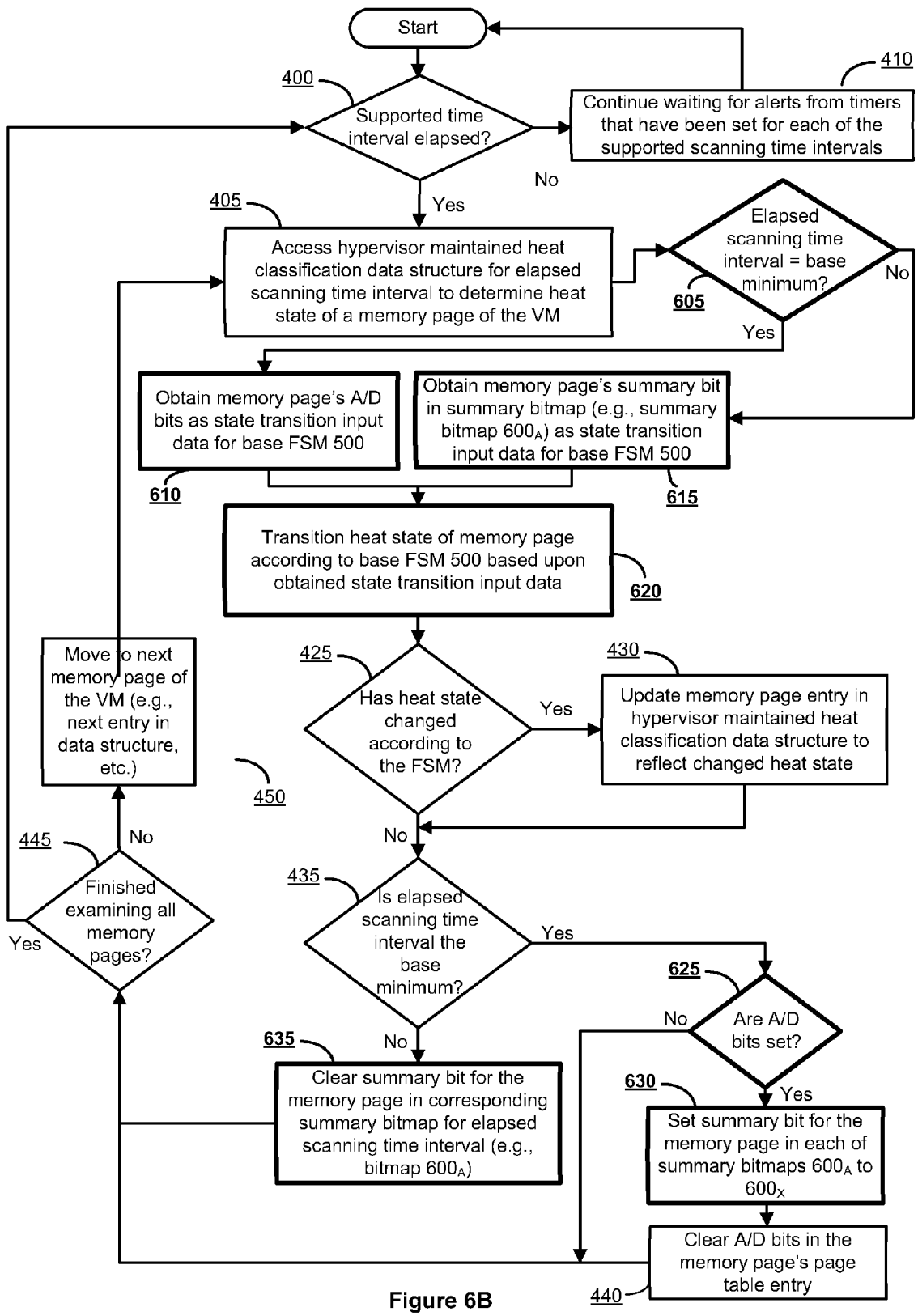
FIG. 6B is a flow diagram for classifying memory pages of a VM for a scanning time interval based on a summary bitmap data structure.

While the combination of the FSMs of FIGS. 5A and 5B illustrate embodiments in which memory page classification module 138 utilizes separate FSMs to determine heat states for different scanning time intervals, alternative embodiments may utilize the a single common FSM, namely base FSM 500, to determine heat states for different scanning time intervals. FIGS. 6A and 6B illustrate one such embodiment. In such an embodiment, however, the input data for the transition state arcs cannot each be the A/D bits since memory page classification module 138 continually clears the A/D bits for the base minimum scanning time intervals in step 440. FIG. 6A depicts additional data structures for supporting multiple scanning time intervals with a common FSM. The data structures of FIG. 6A replicate the heat classification state bitmaps 300 and $305_A$ to $305_X$ of FIG. 3, and, for each scanning time interval corresponding to bitmaps $305_A$ to $305_X$, additionally provide a corresponding supplemental summary bitmap $600_A$ to $600_X$ to preserve state information for additional supported scanning time internals that is lost as a result of clearing the A/D bits in step 440 on elapse of the base minimum scanning time interval.

FIG. 6B is a flow diagram for classifying memory pages of a VM for a scanning time interval based on a summary bitmap data structure. As depicted, FIG. 6B modifies the flow diagram of FIG. 4 to enable use of a single common FSM (e.g., base FSM 500) for all the multiple scanning time intervals by leveraging the summary bitmap data structures of FIG. 6A. After step 405, if the elapsed scanning time interval is the base minimum scanning time interval, as determined in step 605, in step 610, memory page classification module 138 obtains the memory page's A/D bits to use as state transition input data for base FSM 500. If step 605 determines that elapsed scanning time interval is greater than the base minimum scanning time interval, then in step 615, memory page classification module 138 obtains the memory page's summary bit in summary bitmap (e.g., summary bitmap $600_A$) to use as the state transition input data for base FSM 500. In step 620, memory page classification module 138 transitions the heat state of memory page according to base FSM 500 based upon obtained state transition input data (as obtained from either step 610 or 615). The flow of FIG. 6B continues in a similar fashion to that of FIG. 4 until step 435. If the elapsed scanning time interval is the base minimum scanning time interval as assessed in step 435, then in step 625, if the A/D bits of the memory page have been set, in step 630 memory page classification module 138 sets the summary bit for the memory page in each of the summary bitmaps $600_A$ to $600_X$ maintained for each of the supported additional scanning time intervals. If the elapsed scanning time interval is not the base minimum time interval as assessed in step 435, then in step 635, memory page classification module 138 clears the summary bit for the memory page in the summary bitmap (e.g., one of bitmaps $600_A$ to $600_X$ maintained for the elapsed scanning time interval).

Figure 7:
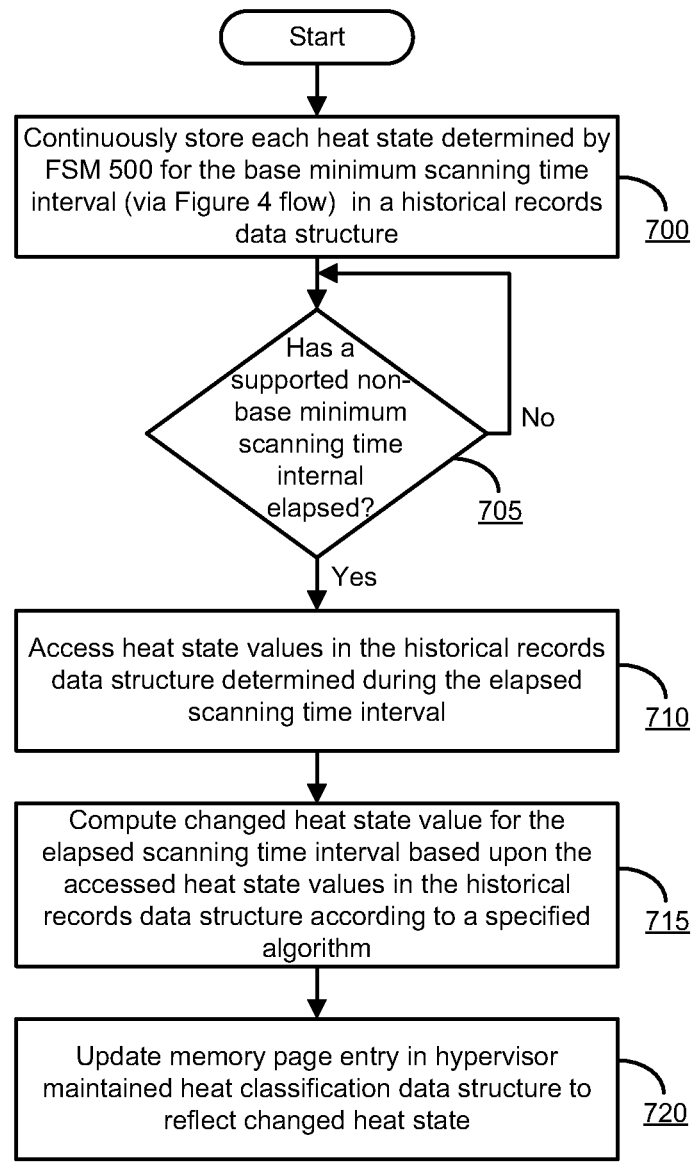
FIG. 7 is a flow diagram for classifying memory pages of a VM into a plurality of states in accordance with of a historical record of heat states.

In yet another embodiment, memory page classification module 138 utilizes FSM 500 only for the base minimum scanning time interval and maintains a historical record of the heat states determined for the base minimum scanning time intervals. Upon elapse of a different supported scanning time interval, memory page classification module 138 utilizes the historical record to determine an appropriate current heat state. FIG. 7 is a flow diagram for classifying memory pages of a VM into a plurality of states in accordance with of a historical record of heat states. In step 700, memory page classification module 138 continuously stores each heat state determined by FSM 500 for the base minimum scanning time interval (via FIG. 4 flow) in a historical records data structure. One embodiment of the historical records data structure is a 3 bit-column bitmap similar to those depicted in FIG. 3, wherein each set of consecutive 3 bits reflects a past heat state determined by FSM 500 for the base minimum scanning time interval. If, a non-base minimum scanning time interval has elapsed as assessed in step 705, then in step 710, memory page classification module 138 accesses heat state values in the historical records data structure determined during the elapsed scanning time interval. For example, if the elapsed scanning time interval is 4 seconds and the base minimum scanning time interval is 1 second, then in step 710, memory page classification module 138 accesses the last 4 heat state values in the historical records data structure. In step 715, memory page classification module 138 computes a changed heat state value for the memory page for the elapsed scanning time interval based upon the accessed heat state values in the historical records data structure according to a specified algorithm. In one embodiment, the specified algorithm determines an average heat state across the accessed heat state values. For example, if 2 of 4 of the accessed heat state values are frigid and the other 2 heat state values are sizzle, then one embodiment of the algorithm determines that the average heat state across the accessed heat state values is warm. It should be recognized that any algorithm, formula or heuristic that calculates a relative heat state value based upon the accessed heat state values in step 710 may be used consistent with the teachings here. In step 715, memory page classification module 138 updates the memory page entry in the heat classification data structure for elapsed scanning time interval (e.g., bitmaps of FIG. 3) to reflect changed heat state.

The techniques taught herein for classifying page heat have general applicability, including, but not limited to, the usage cases discussed below. One application enables efficient process migration, such as live VM migration, from one host machine to another host machine. A given source VM includes state stored in processor registers and state stored in pages of memory. State for the source VM is transmitted to a destination VM while the source VM continues to execute. At some point, the source VM is halted and any remaining state is transmitted to the destination VM. Each memory page that is transmitted needs to be retransmitted if the source VM writes the page prior to being halted. One goal of live VM migration is to minimize the duration of down time associated with halting a source VM and beginning execution of a destination VM. A second goal is to minimize the total time required to perform the migration. Page heat classification enables a live VM migration operation to preferentially identify the coldest (least likely to be written) pages for transmission. In this way, only a relatively minimal hot working set of pages being actively written by the source VM needs to be transmitted during the down time. In this way, downtime can be minimized. Furthermore, by sending cold pages first, the number of pages needing to be retransmitted is reduced, thereby reducing overall migration time.

Another example involves creating an efficient checkpoint for a fast resume operation. A checkpoint is created for an executing virtual machine (or any arbitrary application) by sending the machine state, including active memory pages, for the virtual machine to a log file or another host for storage. A resume operation loads state information from the checkpoint log file into memory and resumes execution of the associated virtual machine after some portion of the checkpoint has been loaded into memory. Page heat at the time a given checkpoint is initiated, is recorded as part of the checkpoint. A subsequent resume operation from the checkpoint loads pages based on a page heat priority, with the hottest pages loaded first and coldest pages loaded last. During the resume operation, a read or write access to any arbitrary page that has not yet been loaded can cause the corresponding page to be loaded with a priority above the page heat priority. In this way, pages that have been actually requested are available with highest priority, while pages that are likely to be accessed in the near future (hot pages) are loaded next, and pages that are least likely to be accessed in the near future are loaded last. Any technically feasible technique may be used to store page heat for a checkpoint. For example, page heat for a given checkpoint may be recorded in a separate file that is accessed during a resume operation to schedule a load sequence for the pages based on page heat. Alternatively, page heat may be implied within the checkpoint by recording pages in the log file that are sorted according to page heat. During a resume operation, the checkpoint file may be loaded sequentially, which has the effect of loading pages according to page heat. One technique for generating a checkpoint for a fast resume operation uses the accessed A bit for the page status value.

Page heat classification may also be applied to more efficiently generate a checkpoint. When the checkpoint is generated, pages are sent for storage in priority order from coldest to warmest. By speculatively saving cold pages in anticipation of a checkpoint operation, the time required to complete a checkpoint operation is reduced. Saving cold pages is an opportunity to save a potentially significant portion of checkpoint state with a low likelihood of needing to re-save the state once the checkpoint operation is actually initiated.

Page heat classification may also be applied in creating fast checkpoints. Creating a checkpoint typically involves sending an initial machine state image to a log file or another host (hot spare), followed by incremental differences that comprise the checkpoints. The incremental differences primarily include pages that have been written (i.e., dirty bit is set) since the last checkpoint. Creating fast checkpoints (multiple checkpoints per second) is a challenging problem because each checkpoint needs to be completed according to a hard real-time deadline. Adding to the challenge is the fact that a given page may be written after it has already been sent as part of the checkpoint. By availing page heat classification information to a fast checkpoint function, the pages comprising the checkpoint may be sent in an order based on heat classification rather than whether they were simply written. One implementation of page heat classification for fast checkpoint generation uses the page D bit for the page status value.

NUMA (Non-Uniform Memory Access) page migration may be optimized using page heat classification. Each machine memory page in a conventional NUMA cluster can be mapped to any virtual page on any NUMA node within the NUMA cluster. However, read and write memory access performance is significantly better for virtual pages mapped to machine memory pages that are local to the NUMA node rather than machine memory pages associated with a different (non-local) NUMA node. With heat classification available for each page within the NUMA cluster, a given hot page may be migrated (copied and re-mapped) to whichever NUMA node is accessing the hot page most frequently. One implementation of page heat classification for NUMA page migration uses the page A bit for the page status value.

Page heat classification may also be applied to improving overall power efficiency for machine memory. Pages of machine memory can be segregated according to their heat classification, which includes both read and write accesses. For example, pages classified as being cold may be copied and remapped to a physically separate portion of machine memory, such as a physically separate memory module. The separate memory module can then be operated in a low power mode. Pages classified as warm through sizzle (hot) are similarly moved to a common portion of machine memory, which is operated in an appropriately high performance (power) mode. Many modern memory subsystems include operating modes that trade off power and performance, allowing the memory subsystems to operate in a reduced power mode when prevailing access performance requirements are reduced. One implementation of page heat classification for improving power efficiency uses the page A bit for the page status value.

Page heat classification may also be incorporated into a paging system within either a hypervisor or a general operating system. When a machine memory page needs to be allocated, but none are currently free, a page eviction policy within the paging system selects which machine memory page should be flushed to a mass storage system to make space for the newly allocated page. Prior art systems conventionally use an event-driven eviction policy, such as a "Least Recently Used" (LRU) or "Least Recently Allocated" (LRA) policy. Such event-driven policies do not necessarily predict which pages are likely to be needed in the future. Indeed, while such policies work reasonably well, they simply indicate which pages have been resident longest in the past. A paging system that incorporates page heat classification into an associated page eviction policy preferentially pages out machine memory pages classified as frigid (cold) because they are least likely to be needed in the near future. Hot pages are avoided when paging because they are most likely to be needed in the near future. One implementation of page heat classification for an improved eviction policy uses the page A bit for the page status value.

Page heat classification may also be used to predict downtime for a process migration operation. Such a prediction may be useful, for example, in determining whether to migrate a given processes from one computer system to another at a particular time. A page heat profile for the target process, in conjunction with estimates for transmitting related data, can be used to closely predict how long a proposed migration operation will take for the target process. Predicted process migration time for a proposed migration operation can be used to determine whether or when to migrate a given process. Furthermore, a set of predicted migration times for processes within a cluster can be used to facilitate efficient load balancing for the cluster. One implementation of page heat classification for process migration time prediction uses the page D bit for the page status value.

In sum, a technique for online page classification is disclosed herein. Classification is tuned for a particular task with a scan rate parameter. The technique periodically samples and clears A/D bits, based on the scan rate parameter, to classify individual pages as being frigid (cold) through sizzling (hot). Classification may be performed by a finite state machine that responds to a history of the A/D bits or by examining a recent history of A/D bit values on an as-needed basis. In certain usage modes, the technique uses only D bits to determine page heat, while in other usage modes the technique uses A bits to determine page heat. A present state for each finite state machine is stored using otherwise unused bits within a standard page table entry (PTE).

One advantage of the present invention is that online classification of each memory page enables memory management functions to better schedule operations based on page heat. For example, live VM migration may perform pre-copy rounds that preferentially target cold through warm pages of memory prior to halting a source VM and copying any remaining context to a destination VM. In this way, the remaining context is generally minimized, which reduces any disruption in the operation of the source VM and reduces overall migration time. One advantage of storing heat classification state within a PTE is that this representation conserves memory and presents excellent locality of reference characteristics during a classification operation.

Although embodiments of the present invention have been described as being applied in a virtual machine environment with hypervisor-managed page tables, the techniques described herein are also applicable to operating systems that employ page tables to manage virtual memory to physical memory page mappings. Furthermore, the techniques taught herein may also be implemented in hardware, such as microcode in a microcode-driven processor, or directly implemented in logic circuits within a processor or processor support device.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for classifying activity levels for memory pages of a virtual machine, the method comprising:
   maintaining a current activity level of each of the memory pages in a first data structure corresponding to a first time interval and in a second data structure corresponding to a second time interval that is less than the first time interval;
   receiving notification of an elapse of the first time interval;
   identifying the current activity level of a memory page of the virtual machine stored in the first data structure;
   retrieving first input data indicating the current activity level of the memory page stored in the second data structure, wherein the first input data is updated at the end of each of the second time intervals that elapsed within the first time interval, the first input data being updated at the end of an elapsed second time interval based on whether or not the memory page was accessed during the elapsed second time interval;
   determining a new activity level of the memory page based on the current activity level stored in the first data structure and the retrieved first input data; and
   storing the new activity level in an entry of the first data structure corresponding to the memory page as the current activity level of the memory page.

2. The method of claim 1, wherein the current activity levels of the memory pages stored in the first and second data structure include a high activity level, a low activity level, and an intermediate activity level.

3. The method of claim 1, wherein determining comprises:
   transitioning from the current activity level to the new activity level in a finite state machine based on the retrieved first input data.

4. The method of claim 3, wherein the second time interval is a minimum time interval supported by a hypervisor of the virtual machine and the A/D bits of a page table entry for the memory page are cleared at the end of each second time interval.

5. The method of claim 3, wherein the first input data is updated at the end of an elapsed second time interval based on whether or not a hypervisor of the virtual machine set a page table entry for the memory page during the elapsed second time interval.

6. The method of claim 3, wherein the first input data indicates one of more than two activity levels of the memory page including a high activity level, a low activity level, and an intermediate activity level.

7. The method of claim 6, wherein the second time interval is a minimum time interval supported by a hypervisor of the virtual machine.

8. The method of claim 6, wherein a second finite state machine is used to update the first input data at the end of an elapsed second time interval based on whether or not the memory page was accessed during the elapsed second time interval.

9. A computer system including one or more virtual machines running therein and a hypervisor configured to classify activity levels of memory pages of a virtual machine by performing the steps of:
   maintaining a current activity level of each of the memory pages in a first data structure corresponding to a first time interval and in a second data structure corresponding to a second time interval that is less than the first time interval;
   receiving notification of an elapse of the first time interval;
   identifying the current activity level of a memory page of the virtual machine stored in the first data structure;
   retrieving first input data indicating the current activity level of the memory page stored in the second data structure, wherein the first input data is updated at the end of each of the second time intervals that elapsed within the first time interval, the first input data being updated at the end of an elapsed second time interval based on whether or not the memory page was accessed during the elapsed second time interval;

determining a new activity level of the memory page based on the current activity level stored in the first data structure and the retrieved first input data; and storing the new activity level in an entry of the first data structure corresponding to the memory page as the current activity level of the memory page.

10. The computer system of claim 9, wherein the current activity levels of the memory pages stored in the first and second data structure include a high activity level, a low activity level, and an intermediate activity level.

11. The computer system of claim 9, wherein the determining step comprises transitioning from the current activity level to the new activity level in a finite state machine based on the retrieved first input data.

12. The computer system of claim 11, wherein the second time interval is a minimum time interval supported by the hypervisor and the A/D bits of a page table entry for the memory page are cleared at the end of each second time interval.

13. The computer system of claim 11, wherein the first input data is updated at the end of an elapsed second time interval based on whether or not a hypervisor of the virtual machine set a page table entry for the memory page during the elapsed second time interval.

14. The computer system of claim 11, wherein the first input data indicates one of more than two activity levels of the memory page including a high activity level, a low activity level, and an intermediate activity level.

15. The computer system of claim 14, wherein the second time interval is a minimum time interval supported by the hypervisor.

16. The computer system of claim 14, wherein a second finite state machine is used to update the first input data at the end of an elapsed second time interval based on whether or not the memory page was accessed during the elapsed second time interval.

17. A non-transitory computer-readable storage medium including instructions that, when executed by a computer processor, causes the computer processor to classify activity levels for memory pages of a virtual machine by performing the steps of:

maintaining a current activity level of each of the memory pages in a first data structure corresponding to a first time interval and in a second data structure corresponding to a second time interval that is less than the first time interval;

receiving notification of an elapse of the first time interval;

identifying the current activity level of a memory page of the virtual machine stored in the first data structure;

retrieving first input data indicating the current activity level of the memory page stored in the second data structure, wherein the first input data is updated at the end of each of the second time intervals that elapsed within the first time interval, the first input data being updated at the end of an elapsed second time interval based on whether or not the memory page was accessed during the elapsed second time interval;

determining a new activity level of the memory page based on the current activity level stored in the first data structure and the retrieved first input data; and storing the new activity level in an entry of the first data structure corresponding to the memory page as the current activity level of the memory page.

18. The non-transitory computer-readable storage medium of claim 17, wherein the current activity levels of the memory pages stored in the first and second data structure include a high activity level, a low activity level, and an intermediate activity level.

19. The non-transitory computer-readable storage medium of claim 17, wherein the determining step comprises transitioning from the current activity level to the new activity level in a finite state machine based on the retrieved first input data.

20. The non-transitory computer-readable storage medium of claim 19, wherein the second time interval is a minimum time interval supported by a hypervisor of the virtual machine and the A/D bits of a page table entry for the memory page are cleared at the end of each second time interval.

21. The non-transitory computer-readable storage medium of claim 19, wherein the first input data is updated at the end of an elapsed second time interval based on whether or not a hypervisor of the virtual machine set a page table entry for the memory page during the elapsed second time interval.

22. The non-transitory computer-readable storage medium of claim 19, wherein the first input data indicates one of more than two activity levels of the memory page including a high activity level, a low activity level, and an intermediate activity level.

23. The non-transitory computer-readable storage medium of claim 22, wherein the second time interval is a minimum time interval supported by a hypervisor of the virtual machine.

24. The non-transitory computer-readable storage medium of claim 22, wherein a second finite state machine is used to update the first input data at the end of an elapsed second time interval based on whether or not the memory page was accessed during the elapsed second time interval.

* * * * *